United States Patent
Kuwata (10) Patent No.: US 6,845,426 B2
(45) Date of Patent: Jan. 18, 2005

(54) DISK CACHE CONTROL FOR SERVICING A PLURALITY OF HOSTS

(75) Inventor: Atsushi Kuwata, Tokyo (JP)

(73) Assignee: NEC Corporation, Tokyo (JP)

( * ) Notice: Subject to any disclaimer, the term of this patent is extended or adjusted under 35 U.S.C. 154(b) by 316 days.

(21) Appl. No.: 10/095,522

(22) Filed: Mar. 13, 2002

(65) Prior Publication Data

US 2002/0131310 A1 Sep. 19, 2002

(30) Foreign Application Priority Data

Mar. 15, 2001 (JP) ........................................ 2001-074425

(51) Int. Cl.[7] ............................................. G06F 12/08
(52) U.S. Cl. ............................. 711/113; 711/3; 711/130
(58) Field of Search .............................. 710/1, 4, 100; 711/3, 4, 5, 111, 112, 113, 130, 147

(56) References Cited

U.S. PATENT DOCUMENTS 5,222,217 A * 6/1993 Blount et al. ................. 707/204
5,363,498 A * 11/1994 Sakuraba et al. ............. 711/147

FOREIGN PATENT DOCUMENTS

JP     04313126 A   * 11/1992
JP     2000-187617     7/2000

* cited by examiner

Primary Examiner—B. James Peikari
(74) Attorney, Agent, or Firm—McGinn & Gibb, PLLC (57) ABSTRACT

A disk array controller prevents a cache page conflicts between a plurality of commands issued from the same host. A disk array controller 10 includes host directors 161 and 162, which are provided for hosts 121 and 122, one for each, and which controls I/O requests from the hosts 121 and 122 to execute input/output to or from disk drives 141 and 142, and a shared memory 18 shared by the host directors 161 and 162 and forming a disk cache. When the host 121 issues a plurality of read commands to the same cache page, the host director 161 starts a plurality of data transfers while occupying the cache page during processing of said plurality of read commands.

48 Claims, 10 Drawing Sheets

FIG.1

| EFFECTIVENESS BIT 221 | ADDRESS INFORMATION 222 | CACHE PAGE NO. 223 | USAGE COUNT 224 |
| --- | --- | --- | --- |
| EFFECTIVENESS BIT 241 | ADDRESS INFORMATION 242 | CACHE PAGE NO. 243 | USAGE COUNT 244 |
| EFFECTIVENESS BIT 261 | ADDRESS INFORMATION 262 | CACHE PAGE NO. 263 | USAGE COUNT 264 |

| LOGICAL DISK 0 | CACHE PARTITION 0 |
|---|---|
| LOGICAL DISK 1 | CACHE PARTITION 1 |
| LOGICAL DISK 2 | CACHE PARTITION 2 |
| LOGICAL DISK 3 | CACHE PARTITION 3 |

DISK CACHE CONTROL FOR SERVICING A PLURALITY OF HOSTS

BACKGROUND OF THE INVENTION

1. Field of the Invention

The present invention relates to a disk array controller that includes a plurality of host directors, each controlling I/O (inut/output) requests from a host and executing I/O processing to or from disk devices, and a shared memory shared by those host directors and forming a disk cache.

2. Description of the Related Art

Recently, the installation of a cache memory on a disk array unit has become vital to increasing throughput. Because only a limited area of a disk array unit generally is accessed, copying a portion of the data to a cache memory ensures a quick response to a host computer.

Another technology that has been proposed in the related art is to balance the load by providing multiple directors each executing I/O processing. This configuration allows the host directors to concurrently process I/O requests from a plurality of hosts. In addition, disk directors, each of which executes physical disk access processing within a disk array unit independently, allow a high-priority host-to-cache data transfer and the cache-to-disk background processing to be executed asynchronously, thus increasing throughput.

Figure 6:
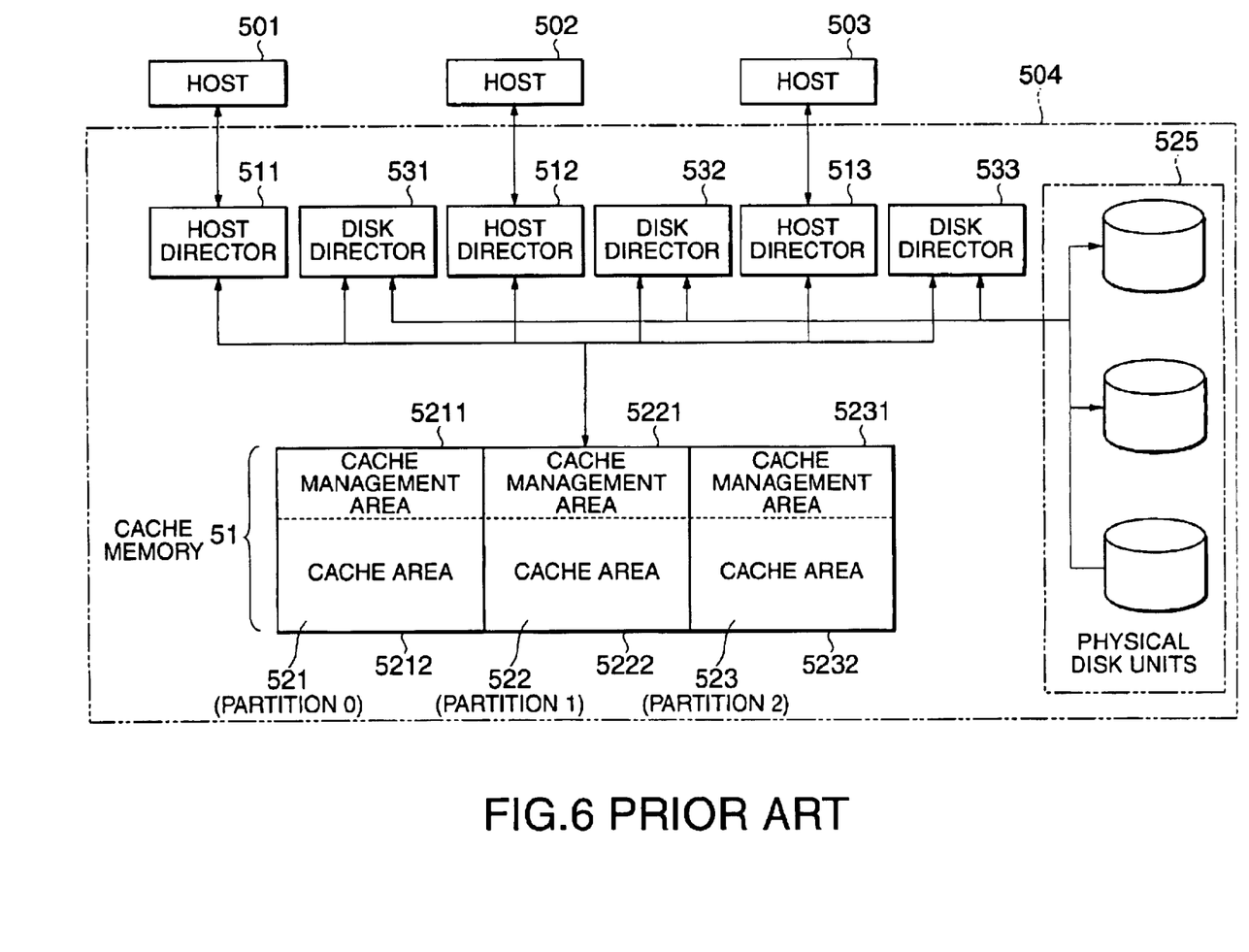
FIG. 6 is a block diagram showing a first related art.
Figure 7:
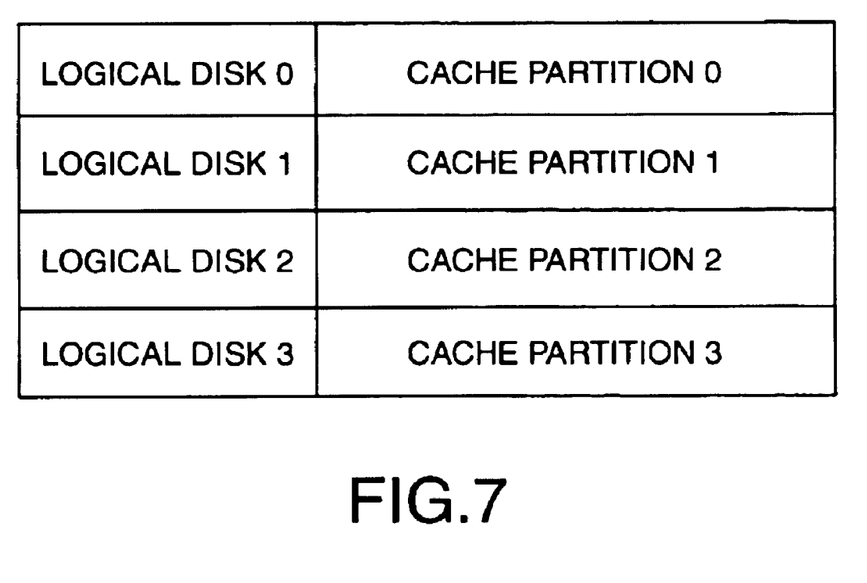
FIG. 7 is a chart showing a correspondence between logical disks and cache partitions used in the first related art.

The Japanese Patent Laid-Open Publication No. 2000-187617 (hereinafter called a first related art) discloses a cache memory management method, for use in a multi-director disk array unit, which allows multiple directors to execute processing concurrently without excluding each other even when multiple directors attempt to access the cache memory management area at the same time. FIG. 6 is a block diagram showing the disk array unit disclosed in the publication. FIG. 7 is a diagram showing the correspondence between logical disks used in this disk array unit and cache partitions. The method disclosed in this publication will be described with reference to those drawings.

A disk array 504 is connected to three hosts 501, 502, and 503 via three host directors 511, 512, and 513. The disk array 504 includes a cache memory 51, host directors 511, 512, and 513, physical disk units 525, and disk directors 531, 532, and 533 connected to the physical disk units 525. The cache memory 51 is divided logically into three partitions 521, 522, and 523. Each partition includes a management area, 5211, 5221, or 5231, and a cache area, 5212, 5222, or 5232, respectively.

Next, the operation will be described. First, assume that an access request is issued from the host 501 to logical disk 0. The host director 511, which uses cache partition 0 according to the correspondence shown in FIG. 7, operates on the cache management area 5211. While processing this request, the cache management area 5211 is exclusively controlled and other directors cannot access it. Assume that another access request is issued from the host 502 to logical disk 1 almost at the same time. The host director 512, which uses cache partition 1, must operate on the cache management area 5221. Because the cache management area 5221 is not exclusively controlled at this time, the director can start operation immediately.

Assume that the host 501 issues multiple write requests continuously. The host director 511 writes some into the cache partition 521, and the others into cache partition 522, according to the logical address. On the other hand, the disk director 531 writes data, which is written into the cache, onto the physical disk units 525 concurrently with the operation of the host director 511. At this time, even if the directors 511 and 531 attempt to access the cache management areas 5211 and 5221 almost at the same time, they can execute processing at the same time if they use different partitions.

As described above, because I/O requests from multiple hosts can be processed concurrently with no conflict in the operation of the cache management areas, the throughput is increased. This is because multiple cache partitions are completely independent and because, when operating on each management area, only the corresponding partition is exclusively controlled.

Recently, disk array units have become large because of an increase in the number of host connection ports, in the capacity of a disk drive and the maximum number of installed disk drives, and in the capacity of the disk cache. To implement such a large disk array unit, a technology has been developed to install multiple processors according to the number of host connection ports and the number of installed disk drives and to allow the shared memory to be used as the disk cache. This technology is called hereinafter a second related art. A disk cache refers to a device or a function that increases the speed of data transfer between a computer and a disk. In operation, data once read from a disk is accumulated in a memory and, the next time the same data is read, data is not read from the disk again but the data accumulated in the memory is used. This technology ensures both a sufficient throughput even in the multi-host connection configuration and scalability (extensibility) that allows host directors to be added as necessary.

Figure 8:
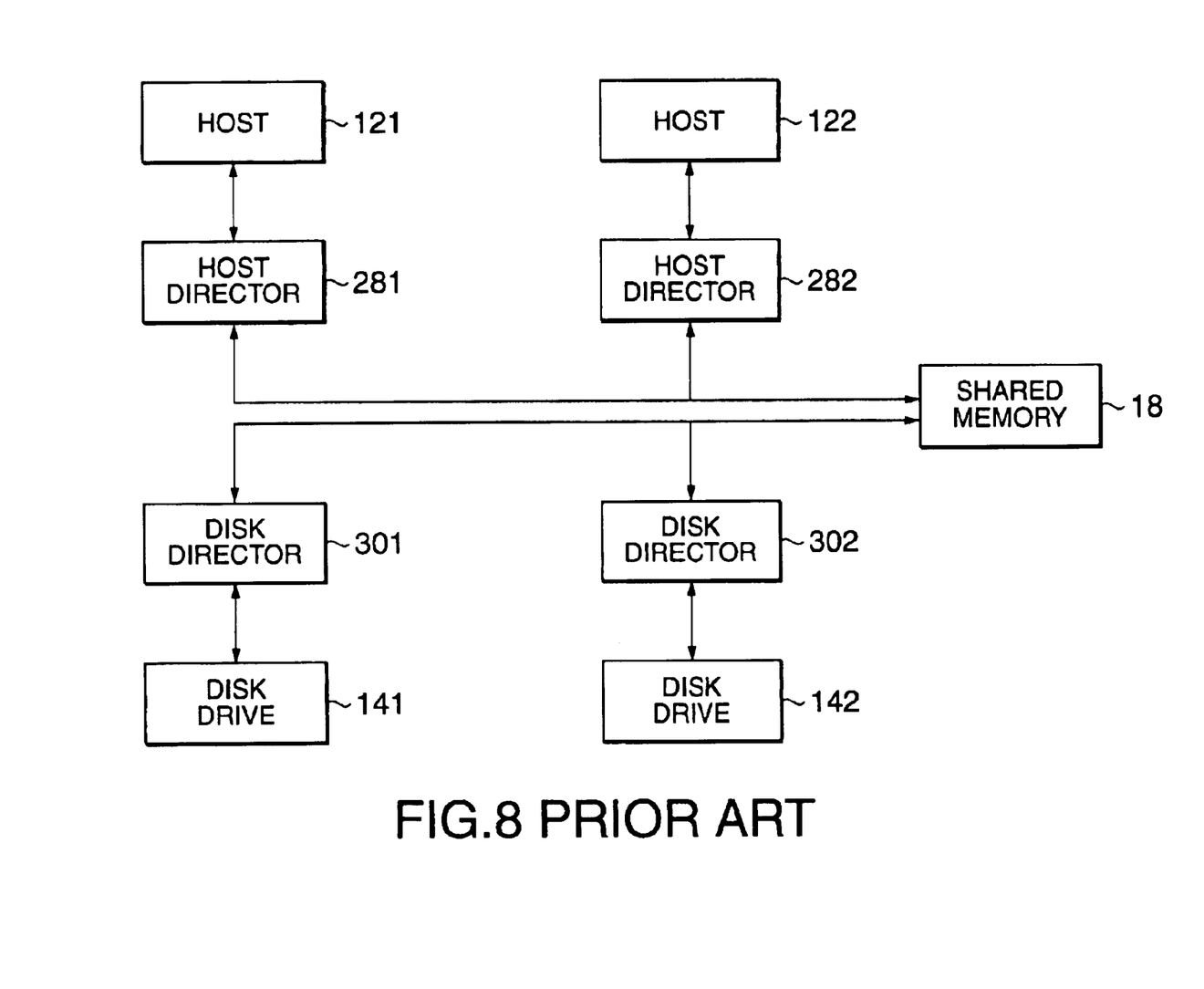
FIG. 8 is a block diagram showing a second related art.

FIG. 8 is a block diagram showing a disk array unit using such a shared memory method. The method will be described with reference to the drawing.

In this disk array unit, a host director 281 is connected to a host 121, and a host director 282 is connected to a host 122, respectively. A disk director 301 is connected to a disk drive 141, and a disk director 302 is connected to a disk drive 142, respectively. The host directors 281 and 282 and the disk directors 301 and 302 execute the concurrent operation while sharing a shared memory 18.

In this disk array unit, the time required to access the disk drives, which involves mechanical operations, is longer than the time required to access the shared memory 18. Therefore, the average performance may be increased by improving the cache hit ratio and by improving the response time at a cache hit time. The response time at a cache hit time is composed primarily of the host interface processing time, data transfer time, and shared memory control processing time. The host interface processing time and the data transfer time have already been reduced significantly by the fiber channel technology. Therefore, it is desired that the time for the shared memory control processing be also reduced. The fiber channel refers to an interface standard for connecting one computer to another or between a computer and a peripheral device with a coaxial cable or a fiber optic cable for high-speed data transfer.

When multiple commands are issued to an address and to the same address or another address near to it almost at the same time, a cache page conflict occurs. A cache page conflict puts the later processing in the wait state until the previous processing is finished because they are processed under exclusive control. Conventionally, there is no serious problem because a cache page conflict is rarely generated by I/O requests from separate hosts. However, when a host makes a multithread access, multiple commands issued from the same host cause a cache page conflict. In this case, the host issues multiple commands at a time to addresses that are near each other, expecting that the disk will transfer data continuously via the interface bus. However, because of a cache page conflict that occurs in the cache array, the cache page delivery processing must be executed after data is transferred and, therefore, the next data transfer cannot be started immediately. A division unit of a director process (processing unit) is called a "thread". A multithread refers to a thread function corresponding to multiple processing requests (host processes) from the host.

Figure 9:
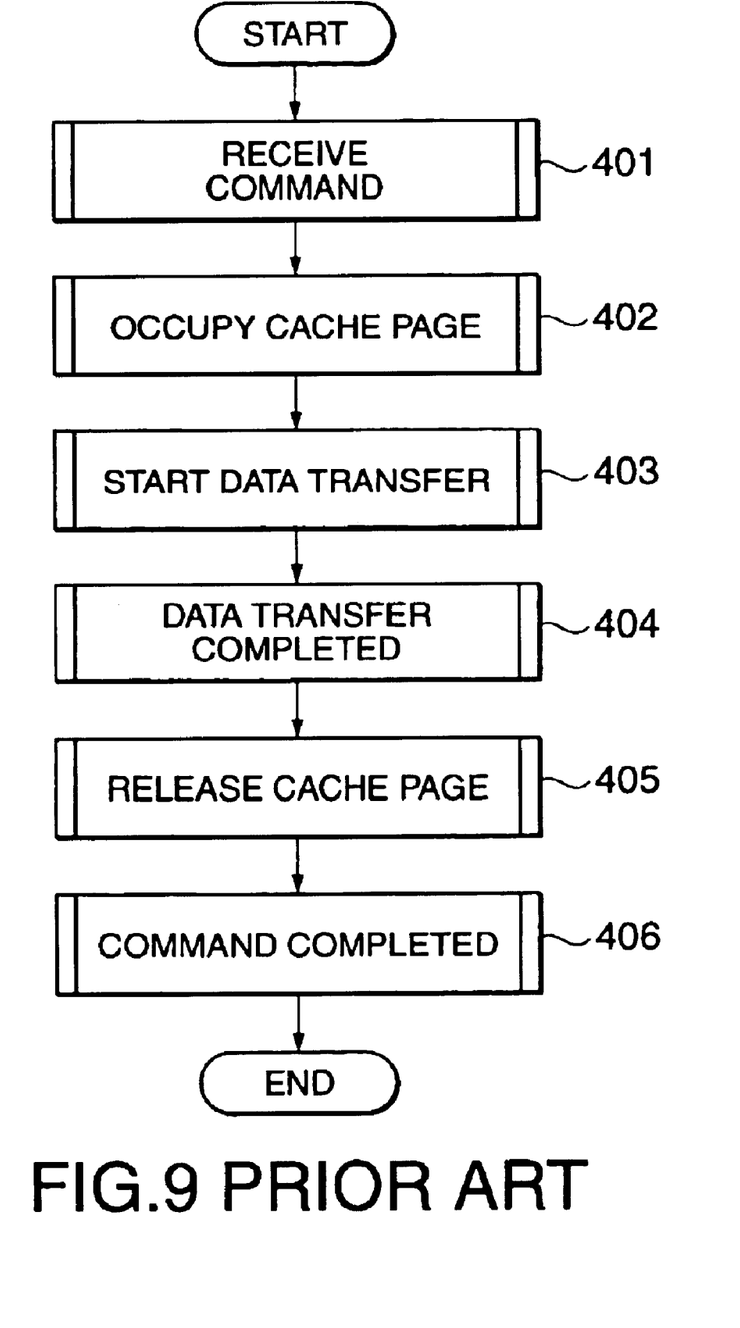
FIG. 9 is a flowchart showing command processing in the second related art.

FIG. 9 is a flowchart showing command processing in the second related art. The operation will be described below with reference to FIG. 8 and FIG. 9.

In response to commands from the hosts 121 and 122 (step 401), the host directors 281 and 282 operate on the management data in the shared memory 18 to occupy cache pages (step 402). After that, the directors start the data transfer (step 403) and wait until the data transfer is completed. When the data transfer is completed (step 404), the directors operate on the management data in the shared memory 18 to release the cache pages (step 405) and complete the commands (step 406).

Figure 10:
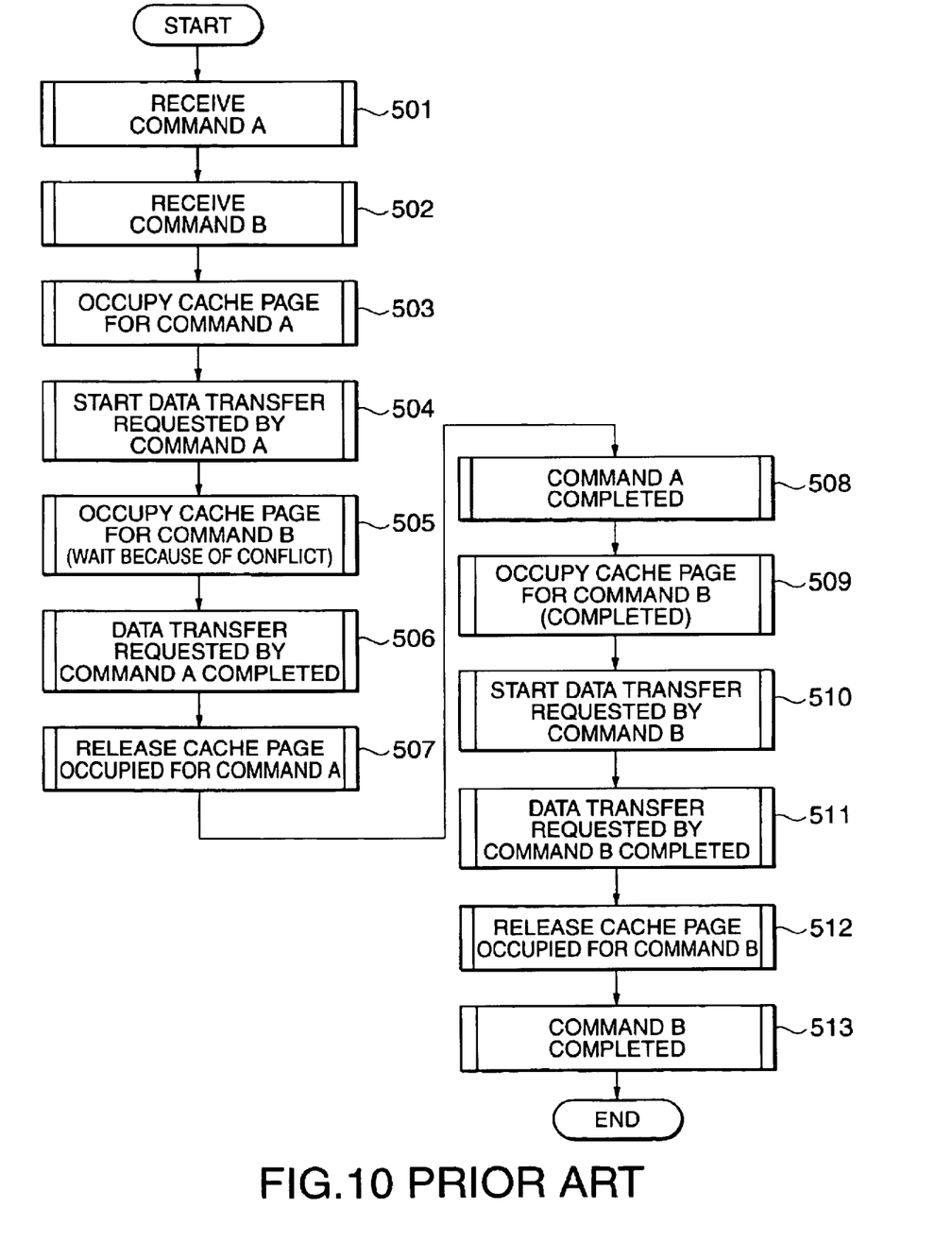
FIG. 10 is a flowchart showing processing when a cache page conflict occurs in the second related art.

FIG. 10 is a flowchart showing the processing that is performed when a cache page conflict occurs because two commands are received continuously from the host in the second related art. The operation will be described with reference to FIG. 8 and FIG. 10.

When command A is received and then command B is received (steps 501, 502), a cache page is occupied first for command A (step 503). Then, when the data transfer requested by command A is started (step 504), the processor becomes free until the transfer is completed and therefore an attempt is made to occupy a cache page for command B (step 505). However, because the cache page to be used is already occupied, command B is put in the conflict wait state. After that, the data transfer requested by command A is completed (step 506), the cache page occupied for command A is released (step 507), and command A is completed (step 508). At this time, command B can occupy the cache page (step 509). After that, command B continues processing (steps 510–513). As described above, from step 506 to step 510, the host interface remains unused except in step 508. This means that the host interface performance is not maximized.

As described above, in the second related art, a cache page conflict occurs when a plurality of commands are issued from the same host. On the other hand, in the first related art, although a cache page conflict between a plurality of commands from separate hosts may be prevented, a cache page conflict occurs when a plurality of commands are issued from the same host.

SUMMARY OF THE INVENTION

It is an object of the present invention to provide a disk array controller that prevents a cache page conflict between a plurality of commands from the same host.

The disk array controller according to the present invention comprises a plurality of host directors, which are provided for hosts, one for each, and which controls I/O requests issued from the hosts to execute input/output to or from disk drives, and a shared memory shared by the host directors and forming a disk cache. When the host issues a plurality of read commands to the same cache page, the host director starts a plurality of data transfers while occupying the cache page during processing of the plurality of read commands. In this case, the host may be configured to issue the plurality of read commands to the same cache page in a multithread mode.

For example, when the host issues a plurality of read commands to the same cache page, the host director occupies the cache page based on the first read command and releases the cache page based on the last read command. More specifically, when the host issues read commands A and B continuously to the same cache page, the host director occupies the cache page and transfers data based on read command A and, after that, transfers data and releases the cache page based on read command B.

In those cases, the host director may be configured to increment a usage counter when the host issues a read command if a cache page address requested by the read command is already requested by some other read command and to decrement the usage counter after transferring data stored at the cache page address. In addition, the host director may be configured to release the cache page at the cache page address when the usage counter is 0.

In other words, the disk array controller according to the present invention saves cache page information in the local memory while occupying a cache page and, even if a cache page conflict occurs in the same processor, does not exclude a command but allows it to use the cache page concurrently if the command is a read command. This configuration allows a plurality of commands to be transferred with no intervening firmware processing, thus significantly increasing performance when random read access requests or sequential read access requests are issued to a narrow range of addresses in a multithread mode.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying, wherein:

DETAILED DESCRIPTION OF THE PREFERRED EMBODIMENTS

Figure 1:
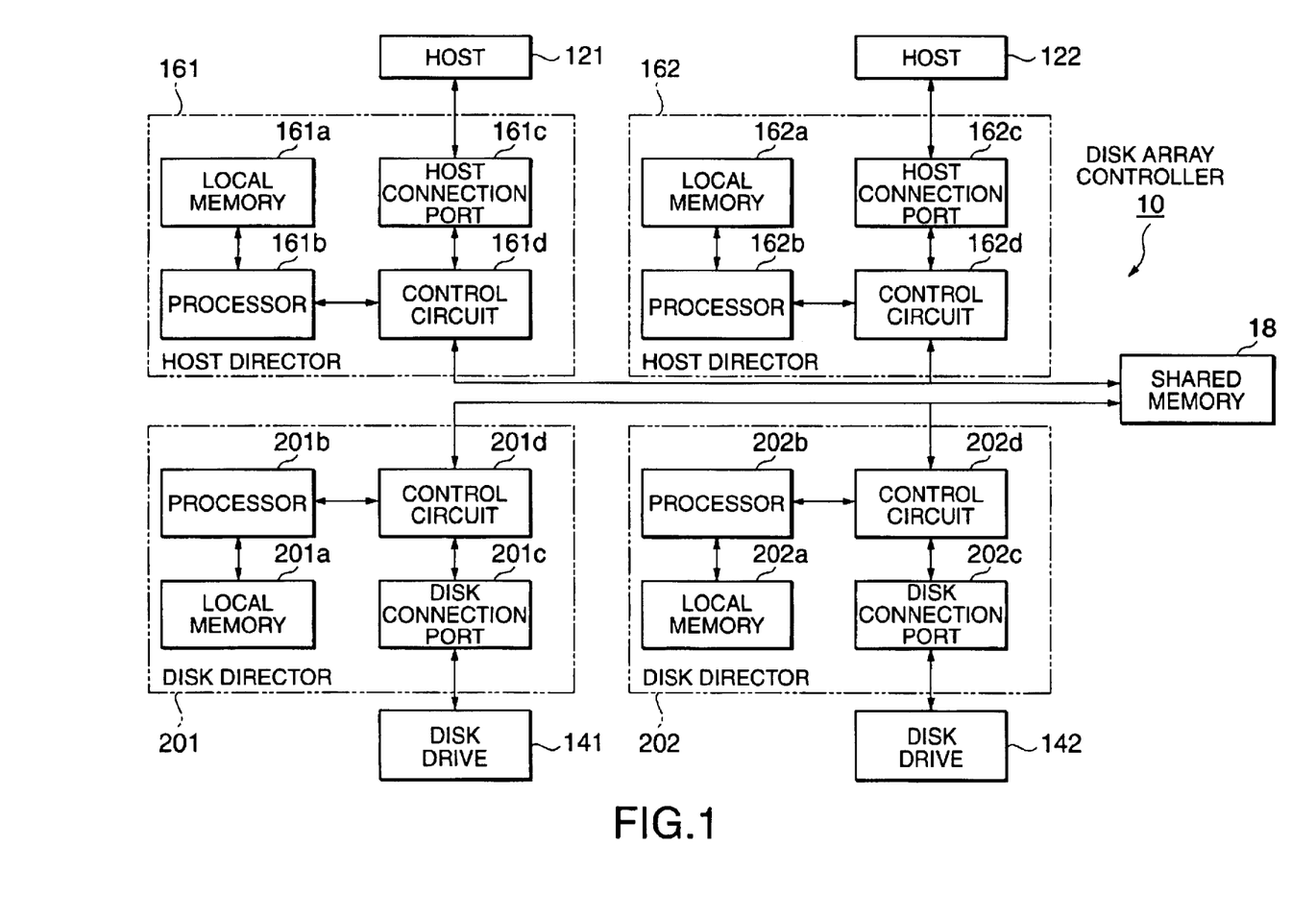
FIG. 1 is a block diagram showing an embodiment of a disk array controller according to the present invention.

FIG. 1 is a block diagram showing an embodiment of a disk array controller according to the present invention. The embodiment will be described below with reference to the drawings.

A disk array controller 10 according to the present invention includes host directors 161 and 162, which are provided for hosts 121 and 122 respectively to control I/O requests from the hosts 121 and 122 and to execute input/output to or from disk drives 141 and 142, and a shared memory 18 shared by the host directors 161 and 162 and forming a disk cache.

When the host 121 issues multiple read commands to the same cache page, the host director 161 can start multiple data transfers while occupying the cache page during processing of the multiple read commands. Similarly, when the host 122 issues multiple read commands to the same cache page, the host director 162 can start multiple data transfers while occupying the cache page during processing of the multiple read commands.

The host director 161 includes a local memory 161a, a processor 161b, a host connection port 161c, and a control circuit 161d. Similarly, the host director 162 includes a local memory 162a, a processor 162b, a host connection port 162c, and a control circuit 162d.

Also provided on the disk array controller 10 are disk directors 201 and 202. The disk director 201 includes a local memory 201a, a processor 201b, a host connection port 201c, and a control circuit 201d. Similarly, the disk director 202 includes a local memory 202a, a processor 202b, a host connection port 202c, and a control circuit 202d.

Next, the components will be described more in detail.

The host 121 is connected to the host director 161 via the host connection port 161c. The host 121 issues multiple commands at a time using a multithread. The processor 161b, which has the fast-access local memory 161a, starts data transfer between the host connection port 161c and the shared memory 18 via the control circuit 161d in response to a command from the host 121 or directly accesses the shared memory 18 to manage data in the shared memory 18. The host director 162, which is connected to the other host 122, can operate independently of the host director 161 but shares information in the shared memory 18. The disk directors 201 and 202 control the data transfer between the disk drives, 141 and 142, and the shared memory 18.

Figure 2:
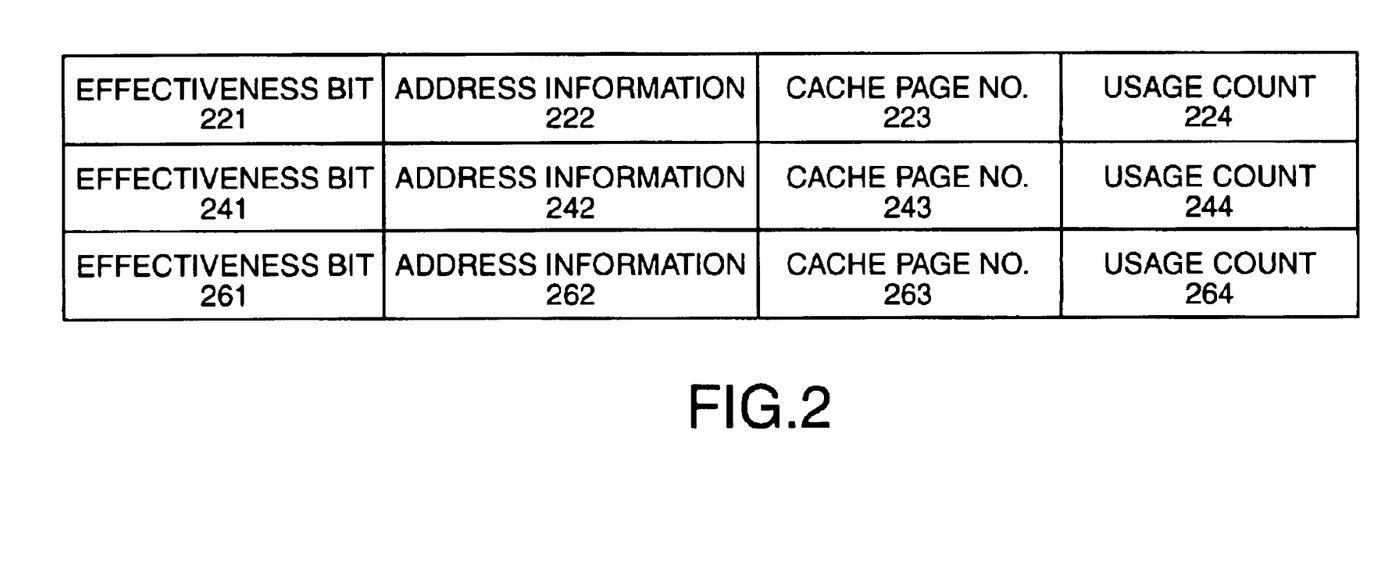
FIG. 2 is a chart showing a cache page management information table stored in a local memory of a host director in the embodiment.

FIG. 2 is a diagram showing a cache page management information table owned by the host directors 161 and 162 in the local memories 161a and 162a. The table will be described with reference to FIG. 1 and FIG. 2.

The cache page management information table has, for each of a plurality of entries, an effectiveness bit, address information, a cache page number, and a usage count. The effectiveness bit, 221, 241, or 261 indicates that the entry is effective. Address information, 222, 242, or 262, indicates the address of a cache page being occupied. The cache page number, 223, 243, or 263, indicates the identifier of the cache page in the shared memory 18. The usage count, 224, 244, or 264, indicates the number of commands that are using the cache page.

Figure 3:
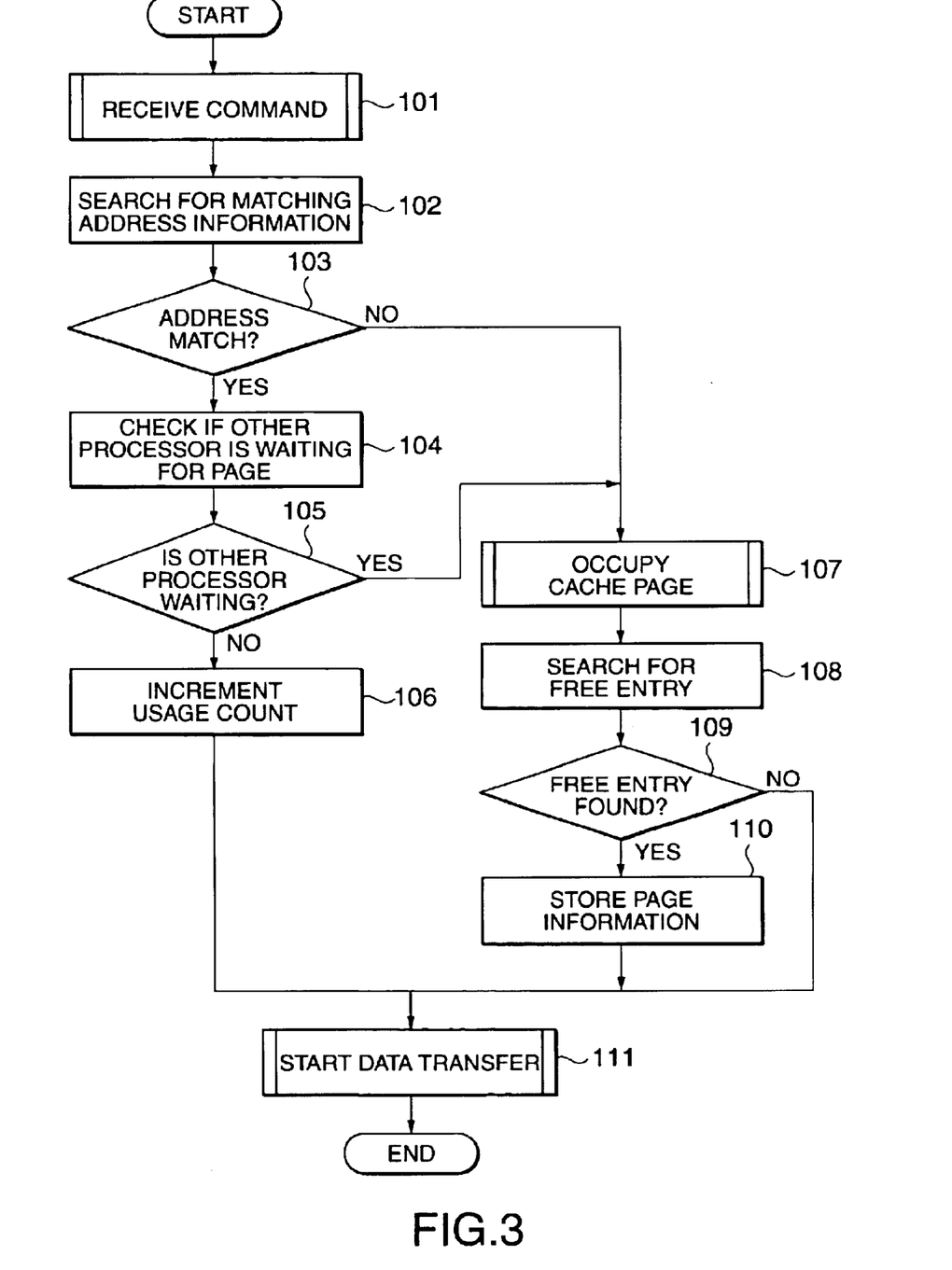
FIG. 3 is a flowchart showing processing executed by a processor for a read command in the embodiment from the time the command is received to the time data transfer is started.

FIG. 3 is a flowchart showing the processing executed by the processor 161b for a read command from the time a read command is received to the time data transfer starts. The data transfer refers to the transfer of data from the shared memory 18 to the host 121 via the control circuit 161d and the host connection port 161c. The operation will be described below with reference to FIGS. 1–3. Note that the processor 162b executes the same operation.

In response to the read command (step 101), the processor searches the cache page management information in the local memory 161a. In this case, the processor searches the cache page management information table for an entry whose address information matches the address specified by the read command (step 102). Assume that the effectiveness bit 221 is effective (ON) and that the address information 222 matches the address specified by the command (step 103). If the address information 222 matches the address specified by the command, a check is made if some processor is waiting for the cache page corresponding to the cache page number 223 in the shared memory 18 (step 104). If no processor is waiting for the cache page, the usage count 224 of the entry is incremented (step 106). The processor now has the cache page usage right and starts data transfer (step 111).

On the other hand, if there is no address information that matches the address specified by the command in step 103, the processor is not occupying the cache page and so occupies the cache page (step 107). Also, if there are processors waiting for the cache page in the shared memory 18 in step 105, a cache page conflict between processors or a write command conflict within one processor has occurred. Therefore, because the command must be executed after the processing to be performed by the waiting processors, the processor occupies the cache page (step 107).

After occupying the cache page occupation (step 107) the processor searches the cache page management information (hereinafter simply called page information) in the local memory 161a for a free entry (step 108). Assume that the effectiveness bit 241 is ineffective (OFF). In this case, it is judged that there is a free entry (step 108). In this case, the effectiveness bit 241 is made effective (ON), the address information is stored in the address information 242, the cache page number is stored in the cache page number 243, and the usage count 244 is set to 1. In this way, information on the occupied page is stored (step 110). After that, the data transfer is started (step 111). This allows a command that will use the same cache page to use it at the same time. If all effectiveness bits are effective (ON), it is judged that there is no free entry (step 109) and no page information is stored. In this case, page information is not stored in the local memory but control is passed to the data transfer start processing step (step 111) to transfer data from the shared memory 18 to the host 121 using the conventional method.

Figure 4:
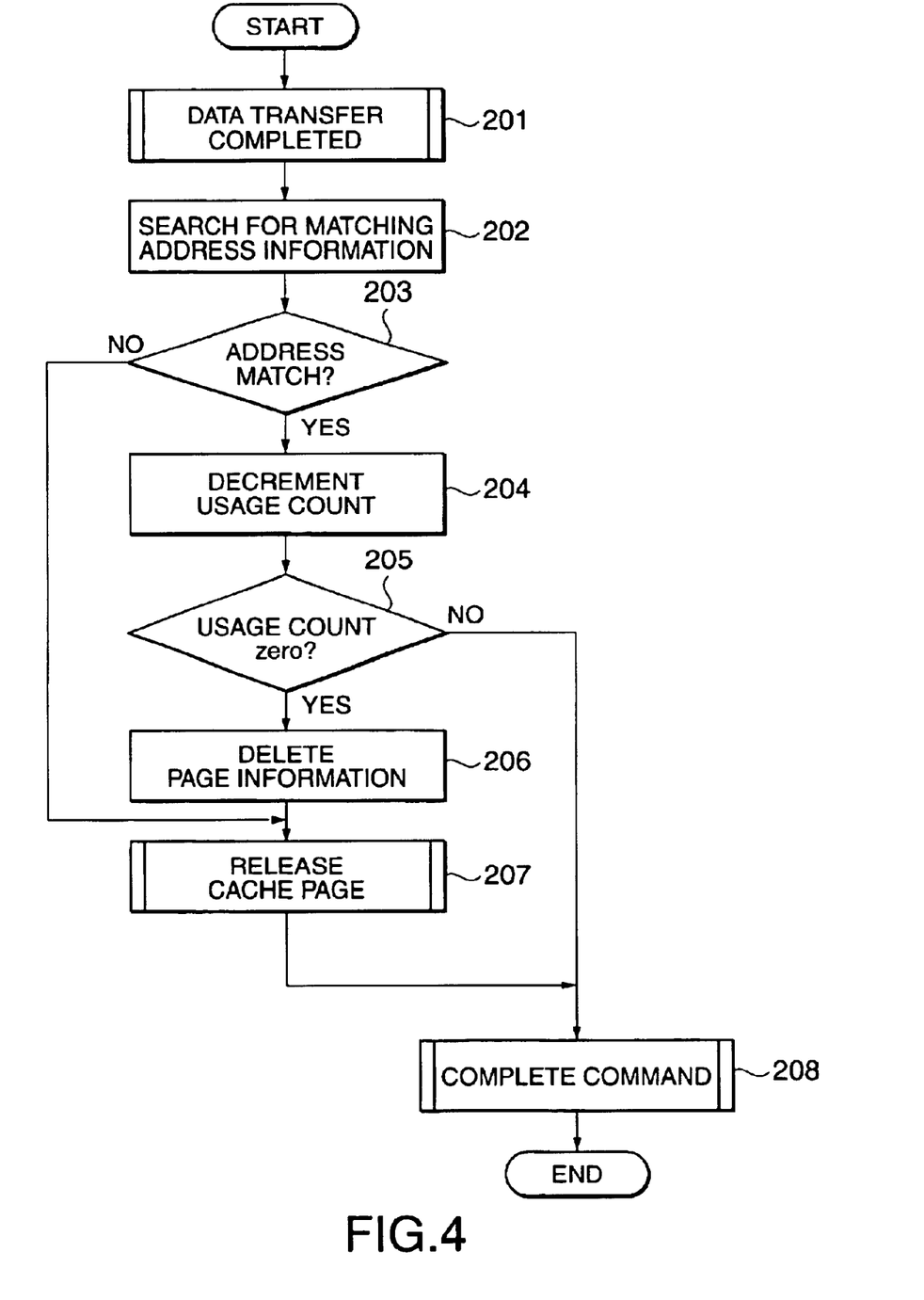
FIG. 4 is a flowchart showing processing executed by a processor for a read command in the embodiment from the time data transfer is completed to the time the command is completed.

FIG. 4 is a flowchart showing the processing executed by the processor 161b for a read command from the time the data transfer is completed to the time the command is completed. The operation will be described below with reference to FIG. 1, FIG. 2, and FIG. 4. Note that the processor 162b executes the same operation.

When the data transfer is completed (step 201), the processor searches the cache page management information in the local memory 161a. At this time, the processor searches the cache page management information for an entry whose address information matches the address specified by the read command (step 202). If there is an entry whose address information matches the address specified by the command (step 203), the usage count of the entry is decremented (step 204). If the result is 0 (step 205), it indicates that there is no process that is using the cache page. Therefore, the effectiveness bit is set to OFF (ineffective) to delete the cache page management information on the cache page (step 206) and to release the cache page (step 207).

On the other hand, if there is no address that matches the address specified by the command in step 203, the cache page is released immediately (step 207). If the usage count is not decremented to 0 in step 205, it indicates that some other process is using the cache page. In this case, the command is completed without releasing the cache page (step 208). Note that, for a write command, the operation is executed according to the conventional procedure shown in the flowchart in FIG. 9.

Figure 5:
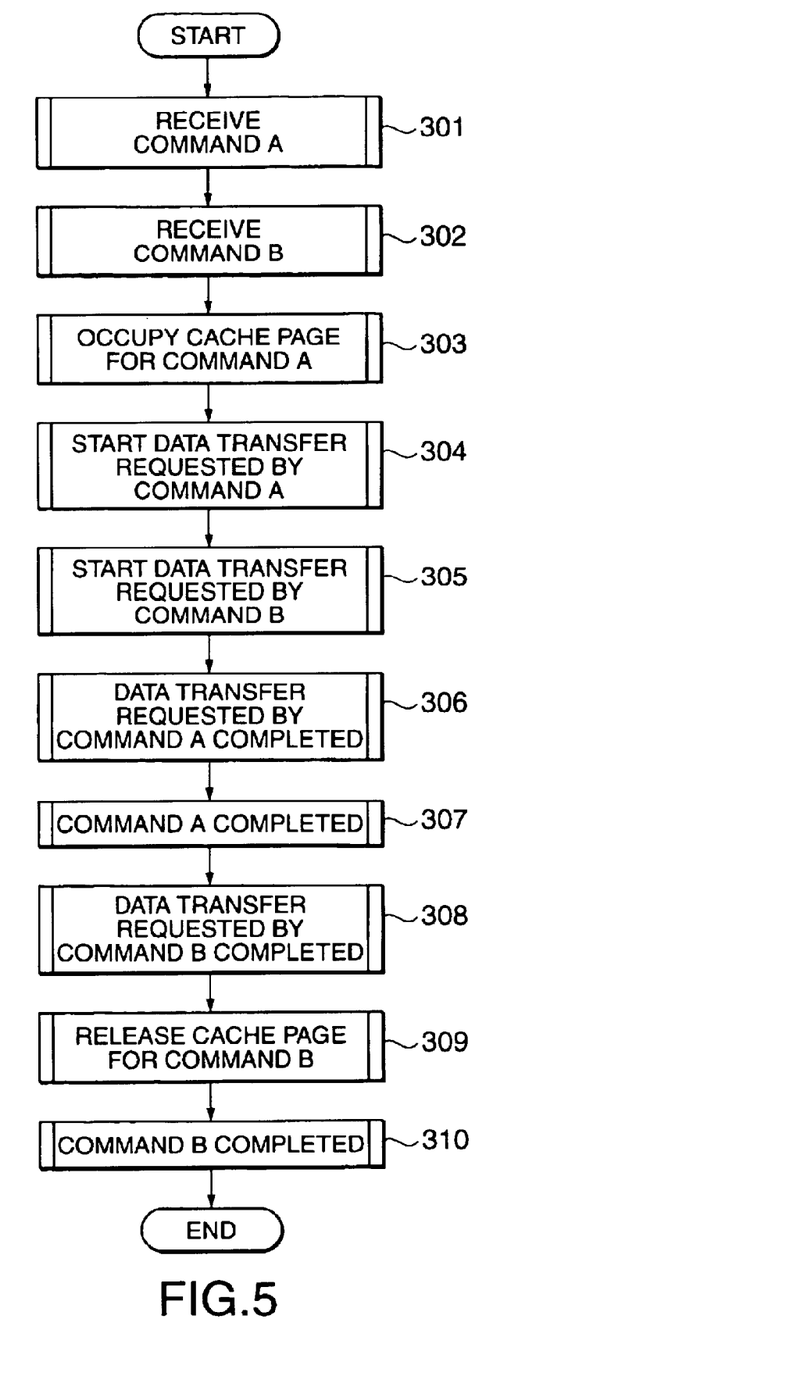
FIG. 5 is a flowchart showing processing executed by a processor in the embodiment when two read commands are received continuously from the host.

FIG. 5 is a flowchart showing the processing executed by the processor 161b when two read commands are received continuously from the host 121. The operation will be described with reference to FIGS. 1, 2, and 5. Note that the processor 162b executes the same operation. The detailed operation is described in FIGS. 3 and 4.

After receiving commands A and B (301, 302), the cache page is occupied based on command A (303), then the data transfer requested by command A is started (304) and, immediately after that, the data transfer requested by command B is started (305). That is, before the data transfer requested by command A is completed (306) and before command A is completed (307), the data transfer requested by command B may be started (305).

When a host issues multiple read commands to the same cache page, the disk array controller according to the present invention starts multiple data transfers while occupying the cache page during the processing of the multiple read commands, preventing a cache page conflict between multiple commands issued from the same host.

In other words, when a host issues a random read access or a sequential read access to a narrow range of addresses in the multithreading mode, the disk array controller according to the present invention starts multiple data transfers while occupying the cache page during the command processing for the same page, thus maximizing the performance of the host interface bus.

While this invention has been described with reference to illustrative embodiments, this description is not intended to be construed in a limiting sense. Various modifications of the illustrative embodiments as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A disk array controller comprising:
   a plurality of host directors provided for a plurality of hosts, one for each, and that control input/output requests issued from the hosts to execute input/output processing at least one of to and from disk devices; and
   a shared memory shared by the host directors and forming a disk cache,
   wherein, when one of the hosts issues a plurality of commands to a cache page, one of said host directors starts a plurality of data transfers maintaining exclusive access to the cache page until a last one of the plurality of commands is executed.

2. The disk array controller according to claim 1, wherein said one of the hosts issues the plurality of commands to the cache page in a multithread mode.

3. The disk array controller according to claim 2, wherein, when said one of the hosts issues a plurality of commands to the cache page, said one of said host directors maintains exclusive access to the cache page based on a first command and releases the cache page based on a last command.

4. The disk array controller according to claim 2, wherein, when said one of the hosts issues read commands A and B continuously to the cache page, said one of said host directors maintains exclusive access to the cache page and transfers data based on command A and, after that, transfers data and releases the cache page based on command B.

5. The disk array controller according to claim 1, wherein, when said one of the hosts issues a plurality of commands to the cache page, said one of said host directors maintains exclusive access to the cache page based on a first command and releases the cache page based on a last command.

6. The disk array controller according to claim 5, wherein, when said one of the hosts issues commands A and B continuously to the cache page, said one of said host directors maintains exclusive access to the cache page and transfers data based on command A and, after that, transfers data and releases the cache page based on command B, and
   wherein, when said one of the hosts issues a command, said one of said host directors increments a usage counter if a cache page address requested by the command is already requested by another command and, after transferring data stored at the cache page address, decrements the usage counter.

7. The disk array controller according to claim 6, wherein, when the usage counter is 0, said one of said host directors releases the cache page at the cache page address.

8. The disk array controller according to claim 1, wherein, when said one of the hosts issues commands A and B continuously to the cache page, said one of said host directors maintains exclusive access to the cache page and transfers data based on command A and, after that, transfers data and releases the cache page based on command B.

9. The disk array controller according to claim 8, wherein, when said one of the hosts issues commands A and B continuously to the cache page, said one of said host directors maintains exclusive access to the cache page and transfers data based on command A and, after that, transfers data and releases the cache page based on command B, and
   wherein, when said one of the hosts issues a command, said one of said host directors increments a usage counter if a cache page address requested by the command is already requested by another command and, after transferring data stored at the cache page address, decrements the usage counter.

10. The disk array controller according to claim 9, wherein, when the usage counter is 0, said one of said host directors releases the cache page at the cache page address.

11. The disk array controller according to claim 1, wherein said one of said host directors comprises at least one of a local memory, a processor, a host connection port, and a control circuit.

12. The disk array controller according to claim 1, further comprising a host connection port included in said one of the host directors,
   wherein said one of the hosts is connected to said one of the host directors by said host connection port.

13. The disk array controller according to claim 1, further comprising a processor, a host connection port, and a control circuit, wherein said processor at least one of transfers data between said host connection port and the shared memory through said control circuit based on a command from said one of the hosts, and accesses the shared memory to manage data in the shared memory.

14. The disk array controller according to claim 1, wherein another of the host directors, which is connected to another of the hosts, operates independently of said one of the host directors.

15. The disk array controller according to claim 1, wherein another of the host directors, which is connected to another of the hosts, shares information in the shared memory with said one of the host directors.

16. The disk array controller according to claim 15, wherein said disk director comprises at least one of a local memory, a processor, a disk connection port, and a control circuit.

17. The disk array controller according to claim 1, further comprising at least one disk director operatively coupled to said shared memory.

18. The disk array controller according to claim 1, wherein one of said host directors comprises a local memory that saves cache page information while said one of said host directors maintains exclusive access to the cache page.

19. The disk array controller according to claim 1, wherein one of said host directors comprises a processor, and wherein, if a cache page conflict occurs in the processor, said one of said host directors does not exclude a command.

20. The disk array controller according to claim 1, wherein one of said host directors comprises a processor, and wherein, if a cache page conflict occurs in the processor, said one of said host directors allows use of the cache page concurrently.

21. The disk array controller according to claim 1, wherein one of said host directors comprises a processor, and wherein, if a cache page conflict occurs in the processor and if a command comprises a predetermined command, said one of said host directors allows use of the cache page concurrently.

22. The disk array controller according to claim 21, wherein said predetermined command comprises a read command.

23. The disk array controller according to claim 1, wherein a plurality of commands are transferred from said one of said hosts without processing.

24. The disk array controller according to claim 1, wherein a plurality of commands are transferred from said one of said hosts without intervening firmware processing.

25. The disk array controller according to claim 1, wherein one of said host directors comprises a local memory, and wherein said local memory comprises at least one of a cache page management information table.

26. The disk array controller according to claim 25, wherein said cache page management information table includes at least one of a plurality of entries, an effectiveness bit, address information, a cache page number, and a usage count, wherein said effectiveness bit indicates that an entry is effective, wherein said address information indicates an address of a cache page being occupied, wherein said cache page number indicates an identifier of a cache page m the shared memory, and wherein said usage count indicates a number of commands that are using a cache page.

27. The disk array controller according to claim 1, wherein, when said one of said hosts issues at least one of a random access and a sequential access to a range of addresses in a multithreading mode, said one of said host directors starts a plurality of data transfers maintaining access to the cache page during command processing for the cache page.

28. The disk array controller according to claim 27, wherein said at least one of said random access comprises a random read access.

29. The disk array controller according to claim 27, wherein said at least one of said sequential access comprises a sequential read access.

30. A disk array controller comprising:

a plurality of host directors provided for a plurality of hosts and that control input/output requests issued from the hosts to execute input/output processing at least one of to and from disk devices; and a shared memory shared by the host directors and forming a disk cache, wherein, when one of the hosts issues a plurality of commands to a cache page, one of said host directors starts a plurality of data transfers and maintains exclusive access to the cache page until a last one of the plurality of commands is executed, and wherein said one of said host directors comprises a host connection port that connects said one of the hosts to said one of the host directors.

31. The disk array controller according to claim 30, wherein said one of said host directors comprises a processor that at least one of transfers data between the host connection port and the shared memory through a control circuit based on a command from said one of the hosts, and accesses the shared memory to manage data in the shared memory.

32. The disk array controller according to claim 30, wherein said one of said host directors comprises a local memory operatively coupled to said processor.

33. The disk array controller according to claim 32, wherein said disk director controls transfer of data between one of the disk devices and the shared memory.

34. A method of controlling a disk array, comprising:

providing a plurality of host directors for a plurality of hosts for controlling input/output requests issued from the hosts to execute input/output processing at least one of to and from disk devices; and providing a shared memory shared by the host directors for forming a disk cache, wherein, when one of the hosts issues a plurality of commands to a cache page, one of said host directors starts a plurality of data transfers maintaining exclusive access to the cache page until a last one of the plurality of commands is executed.

35. The method according to claim 34, further comprising issuing the plurality of commands to the cache page in a multithread mode.

36. The method according to claim 34, further comprising, when said plurality of commands are issued to the cache page, maintaining exclusive access the cache page based on a first command and releasing the cache page based on a last command.

37. The method according to claim 34, wherein a plurality of commands are transferred from said one of said hosts without intervening firmware processing.

38. A method of controlling a disk array, comprising:

controlling input/output requests issued from a plurality of hosts to execute input/output processing at least one of to and from disk devices, using a plurality of host directors; and forming a disk cache by providing a shared memory shared by the host directors, wherein, when one of the hosts issues a plurality of commands to a cache page, one of said host directors starts a plurality of data transfers maintaining exclusive access to the cache page until a last one of the plurality of commands is executed.

39. The method according to claim 38, wherein a plurality of commands are transferred from said one of said hosts without intervening firmware processing.

40. A method of controlling a disk array, comprising:

searching a local memory, including cache page management information, for an entry including address information that matches an address specified by a command, wherein, if the address information matches the address specified by the command, checking whether a processor is waiting for the cache page corresponding to a cache page number stored in a shared memory, wherein, if a processor is determined not to be waiting for the cache page, incrementing a usage count of the entry, to obtain usage right to the cache page, and starting data transfer.

41. The method according to claim 40, wherein, if the address information does not match the address specified by the command, said method further comprises maintaining exclusive access to the cache page.

42. The method according to claim 40, wherein, if a processor is determined to be waiting for the cache page, the method further comprises determining an occurrence of at least one of a cache page conflict between at least two processors and a write command conflict within one processor.

43. The method according to claim 40, further comprising maintaining exclusive access to the cache page.

44. The method according to claim 40, wherein, after maintaining exclusive access to the cache page, the method further comprises searching the cache page management information stored in the local memory for a free entry.

45. The method according to claim 40, wherein said cache page management information includes at least one of a plurality of entries, an effectiveness bit, address information, a cache page number, and a usage count.

46. The method according to claim 45, wherein, if a free entry is determined, performing at least one of storing address information in said local memory, storing the cache page number in said local memory, and setting the usage count to 1, thereby storing information on the cache page.

47. The method according to claim 46, further comprising starting data transfer, thereby allowing concurrent use of the cache page.

48. The method according to claim 45, wherein, if a free entry is not determined, then page information is not stored, and data is transferred from the shared memory to a host.

* * * * *